US006947683B2

United States Patent
Na

(10) Patent No.: US 6,947,683 B2
(45) Date of Patent: Sep. 20, 2005

(54) VARIABLE VOLTAGE SWITCHABLE FIXING APPARATUS AND PRINTER THEREWITH

(75) Inventor: Tae-kwon Na, Chungiu (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 200 days.

(21) Appl. No.: 10/603,748

(22) Filed: Jun. 26, 2003

(65) Prior Publication Data

US 2004/0004853 A1 Jan. 8, 2004

(30) Foreign Application Priority Data

Jul. 5, 2002 (KR) ........................................ 2002-39009

(51) Int. Cl.[7] .......................... G03G 15/00; G03G 15/20
(52) U.S. Cl. ........................... 399/67; 219/216; 399/33; 399/88; 399/320
(58) Field of Search ............................... 399/67, 69, 88, 399/33, 37, 320; 219/216, 476, 477, 480, 507; 307/38, 139, 140, 80, 125, 126; 323/282

(56) References Cited

U.S. PATENT DOCUMENTS

| 6,157,010 A | * | 12/2000 | Mine | 219/216 X |
| 6,522,844 B2 | * | 2/2003 | Yamane et al. | 399/67 |
| 2001/0020610 A1 | * | 9/2001 | Yoshimura | 219/216 |
| 2004/0067072 A1 | * | 4/2004 | Suzuki et al. | 399/69 |

* cited by examiner

Primary Examiner—Sophia S. Chen
(74) Attorney, Agent, or Firm—Staas & Halsey LLP

(57) ABSTRACT

A 110V/220V switchable fixing apparatus and a printer therewith including an input voltage detector unit detecting an input voltage of an AC power supply and outputting a signal corresponding to the detected input voltage, a first resistance body having a first end thereof connected to a second terminal of the AC power supply, a second resistance body having a first end thereof connected to a second end of the first resistance body, a first switching unit connected between a second end of the second resistance body and a first terminal to switch on or switch off in response to a control signal from an engine control unit, the engine control unit and a second switching unit connected between the second end of the first resistance body and the second terminal to switch on or switch off in response to the output signal from the input voltage detector unit.

20 Claims, 4 Drawing Sheets

VARIABLE VOLTAGE SWITCHABLE FIXING APPARATUS AND PRINTER THEREWITH

CROSS-REFERENCE TO RELATED APPLICATIONS

This application claims the benefit of Korean Application No. 2002-39009, filed Jul. 5, 2002, in the Korean Intellectual Property Office, the disclosure of which is incorporated herein by reference.

BACKGROUND OF THE INVENTION

1. Field of the Invention

The present invention relates to a 110V and 220V switchable image fixing apparatus and a printer therewith, and more particularly to a 110V/220V switchable image fixing apparatus and a printer therewith capable of operating a heating body corresponding to an input voltage.

2. Background of the Related Art

As is well known to those skilled in the art, printers are roughly classified into electrophotographic printers, ink-jet printers and thermal transfer printers according to printing mechanisms thereof.

A printing mechanism determines elements of a printer.

A conventional electrophotographic printer includes a photoconductor, a developer, a transfer device and a fixing device.

The transfer device transfers an image on the photoconductor, which is treated with a developing agent by the developer, onto a paper. The fixing device fuses the transferred image into the paper.

The transfer device and fixing device may be separately employed, or may be used as an integrated unit, wherein the integrated unit transfers and fuses the image simultaneously by heating a surface of a transfer roller.

A conventional fixing device heats a surface of a fixing roller, which is additionally installed to press and shift a paper fed through a transfer/fixing roller or a transfer roller, and an AC drive lamp is generally used as a heating body to heat a surface of the fixing roller.

Conventionally, a drive voltage for the AC drive lamp is fixed to either 110V or 220V, so the AC drive lamp having a proper voltage has to be used for either of a 110V printer or a 220V printer.

Users may put a plug of the 110V printer in a 220V power supply or may equip a 220V printer with an 110V AC drive lamp upon assembly, thereby causing damage to the AC drive lamp.

SUMMARY OF THE INVENTION

An aspect of the invention is to solve at least the above problems and/or disadvantages and to provide a variable voltage switchable fixing apparatus and a printer therewith capable of preventing a damage of a heating body by applying a proper voltage to the heating body with respect to an input voltage.

Accordingly, an aspect is to provide a variable voltage switchable fixing apparatus of a printer having a control unit to control an engine of the printer. The variable voltage switchable fixing apparatus comprises: an input voltage detector detecting an input voltage of a power supply inputted thereto and outputting a signal corresponding to the detected input voltage; a first resistance body having a first end thereof connected to a second terminal of the power supply; a second resistance body having a first end thereof connected to a second end of the first resistance body; a first switching unit connected between a second end of the second resistance body and a first terminal of the power supply to switch on or to switch off in response to a control signal from the control unit; and a second switching unit connected between the second end of the first resistance body and the second terminal of the power supply to switch on or to switch off in response to the output signal from the input voltage detector.

According to the variable voltage switchable fixing apparatus, the input voltage detector comprises: a first input voltage detector unit having a first luminous element connected between the first terminal and a junction of a first zener diode and a first diode, wherein the first zener diode and the first diode are connected in series between the first and second terminals of the power supply; and a second input voltage detector unit having a second luminous element connected between the second terminal of the power supply and a junction of a second zener diode and a second diode, wherein the second zener diode and the second diode are connected in series between the first and second terminals of the power supply. The second switching unit comprises: a plurality of phototransistors connected in parallel to turn on or to turn off in response to whether the first and second luminous elements radiate.

According to the variable voltage switchable fixing apparatus, the first resistance body and the second resistance body are lamps.

According to the variable voltage switchable fixing apparatus, the first resistance body is a resistance element providing a voltage drop and the second resistance body is a lamp.

The variable voltage switchable fixing apparatus further comprises: a rectifier rectifying and smoothing the input voltage to generate a DC voltage, wherein the input voltage detector detects an output voltage from the rectifier and outputs a signal corresponding to the detected output voltage to the second switching unit.

According to another aspect, a 110V/220V switchable printer comprises: a photoconductor; a fixing apparatus transferring an image developed on the photoconductor by a developer to a paper and fixing the transferred image on the paper by applying a heat of a certain temperature; an input voltage detector detecting an input voltage of a AC power supply inputted thereto and outputting a signal corresponding to the detected input voltage; a first resistance body having a first end thereof connected to a second AC terminal of the AC power supply; a second resistance body having a first end thereof connected to a second end of the first resistance body; a first switching unit connected between a second end of the second resistance body and a first AC terminal of the AC power supply to switch on or to switch off; a second switching unit connected between the second end of the first resistance body and the second AC terminal of the AC power supply to switch on or to switch off; and a control unit connected so as to input the signal outputted from the input voltage detector controlling the first and second switching units.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF PREFERRED EMBODIMENTS

Figure 1:
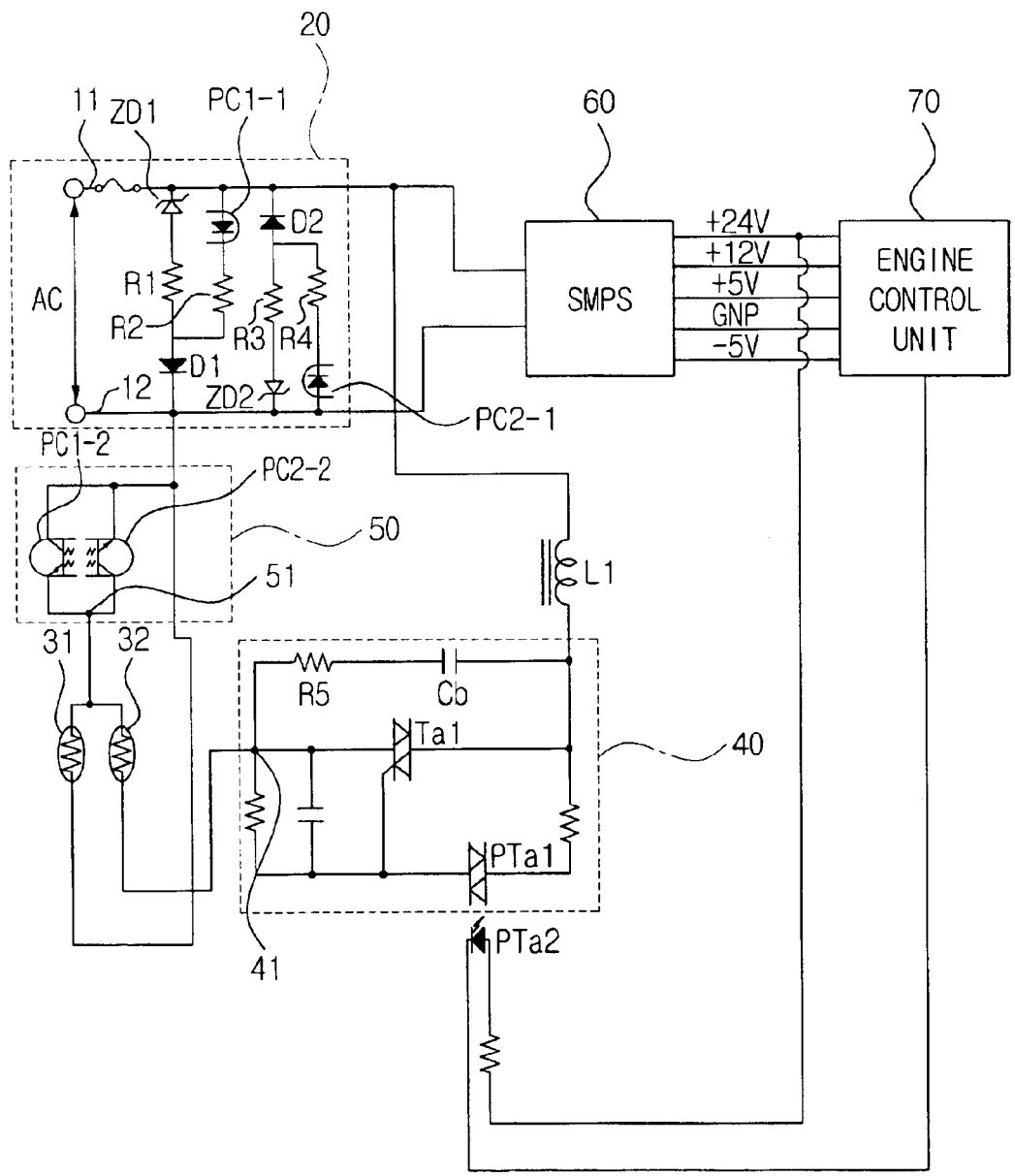
FIG. 1 is a circuit diagram showing a part of a printer with a fixing device in accordance with a first embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a circuit diagram showing a part of a printer with a fixing device in accordance with a first embodiment of the present invention.

As shown in FIG. 1, the fixing device comprises an input voltage detector 20, a first switching unit 40, a second switching unit 50, a first resistance body 31 and a second resistance body 32.

The input voltage detector 20 detects an input voltage inputted through a first AC terminal 11 and a second AC terminal 12 of a plug, through which commercial AC power is supplied. The input voltage detector 20 outputs a signal corresponding to a detected result.

The input voltage detector 20 includes a first input voltage detector and a second input voltage detector.

The first input voltage detector outputs a voltage detection signal corresponding to an AC signal, which is 0 to 180 degrees in a phase thereof compared to the commercial AC power. To this end, the first input voltage detector includes a first zener diode ZD1, a first resistance element R1 and a first diode D1 connected in series between the first AC terminal 11 and the second AC terminal 12 forming a current path when a current flows from the first AC terminal 11 to the second AC terminal 12, and a first luminous element PC1-1 and a second resistance element R2 connected in series between the first AC terminal 11 and a node between the first diode D1 and the first resistance element R1. The first luminous element PC1-1 is a part of a first photocoupler with a first phototransistor PC1-2.

The second input voltage detector outputs a voltage detection signal corresponding to the AC signal, which is 180 to 360 degrees in the phase thereof compared to the commercial AC power. To this end, the second input voltage detector includes a second zener diode ZD2, a third resistance element R3 and a second diode D2 connected in series between the first AC terminal 11 and the second AC terminal 12 forming a current path when a current flows from the second AC terminal 12 to the first AC terminal 11, and a second luminous element PC2-1 and a fourth resistance element R4 connected in series between the second AC terminal 12 and a node between the second diode D2 and the third resistance element R3. The second luminous element PC2-1 is a part of a second photocoupler PC2, with a second phototransistor PC2-2.

The first and second zener diodes ZD1 and ZD2 have trigger voltages thereof of 110V or a voltage lower than maximum allowable voltages of 110V lamps, which are applied as resistance bodies to provide heat.

The input voltage detector 20 forms a current path through the first and second luminous diodes PC1-1 and PC2-1 to radiate on a trigger voltage (i.e. lower than 110V) and a current path through the first and second zener diodes ZD1 and ZD2 on a voltage higher than 110V when the first and second luminous diodes PC1-1 and PC2-1 are off.

The first switching unit 40 switches on or switches off in response to a control signal from an engine control unit 70 and is connected between a second end of the second resistance body 32 and the first AC terminal 11 to control an engine of the printer.

The first switching unit 40 includes a series of a capacitor Cb and a fifth resistance element R5, a triac Ta1 connected in parallel with the series and a phototriac PTa1 triggering a gate terminal of the triac Ta1. A third luminous element PTa2 is provided to couple with the phototriac PTa1 and controlled by the engine control unit 70.

The first switching unit 40 turns on or turns off an electric current flowing through an inductor L1, the inductor L1 being connected to the first AC terminal 11 and the second terminal of the second resistance body 32 through the phototriac PTa1. The phototriac PTa1 is turned on/off in response to whether the third luminous element PTa2 is radiating under a control of the engine control unit 70.

Further, the inductor L1, capacitor Cb and fifth resistance element R5 remove noises and provide frequency compensation.

The second switching unit 50 includes the first and second phototransistors PC1-2 and PC2-2 connected in parallel between the second AC terminal 12 and a node 51 and between the first and second resistance bodies 31 and 32, respectively, to switch on/off in response to whether the first and second phototransistors PC1-2 and PC2-2 are radiated by the first luminous element PC1-1 and the second luminous element PC2-1, respectively. The first photocoupler includes the first luminous element PC1-1 and the first phototransistor PC1-2. The second photocoupler includes the second luminous element PC2-1 and the second phototransistor PC2-2.

A first end of the first resistance body 31 is connected to the second AC terminal 12.

A first end of the second resistance body 32 is connected to a second end of the first resistance body 31, which forms the node 51, and the second end of a second resistance body 32 is connected to a first end 41 of the first switching unit 40.

The first and second resistance body 31 and 32 may include 110V lamps.

The first resistance body 31 may include a resistance element to provide a voltage drop and the second resistance body 32 may include a 110V lamp.

The first and second resistance bodies 31 and 32 may be installed in a desirable position such as an inside of a fixing roller to heat the fixing roller (not shown).

A SMPS (Switching Mode Power Supply) 60 generates various voltages for the printer. The engine control unit 70 controls printing for the printer.

The SMPS 60 may include a conventional 110V/220V switchable power supply.

The engine control unit 70 controls elements of an engine such as a photoconductor, a charger, a developer and a paper feeder, not shown, as well as the fixing apparatus.

Fractions of an input voltage are serially supplied to the first and second resistance bodies 31 and 32, or the input voltage is supplied only to the second resistance body 32. When the input voltage is a voltage lower than 110V, the second switching unit 50 is turned on, so that power is supplied to the second resistance body 32 in response to whether the first switching unit 40 is turned on or turned off. When an input voltage is a voltage higher than 110V (i.e. 220V) the second switching unit 50 is turned off so that the power is serially supplied to the first and second resistance bodies 31 and 32 in response to whether the first switching unit 40 is turned on or turned off.

The input voltage detector 20 of the printer to which the above fixing device is applied, may supply the electric power to either of the first and second resistance bodies 31 and 32 or to the second resistance body 32 by rectifying the AC voltage and detecting a smooth DC voltage.

Figure 3:
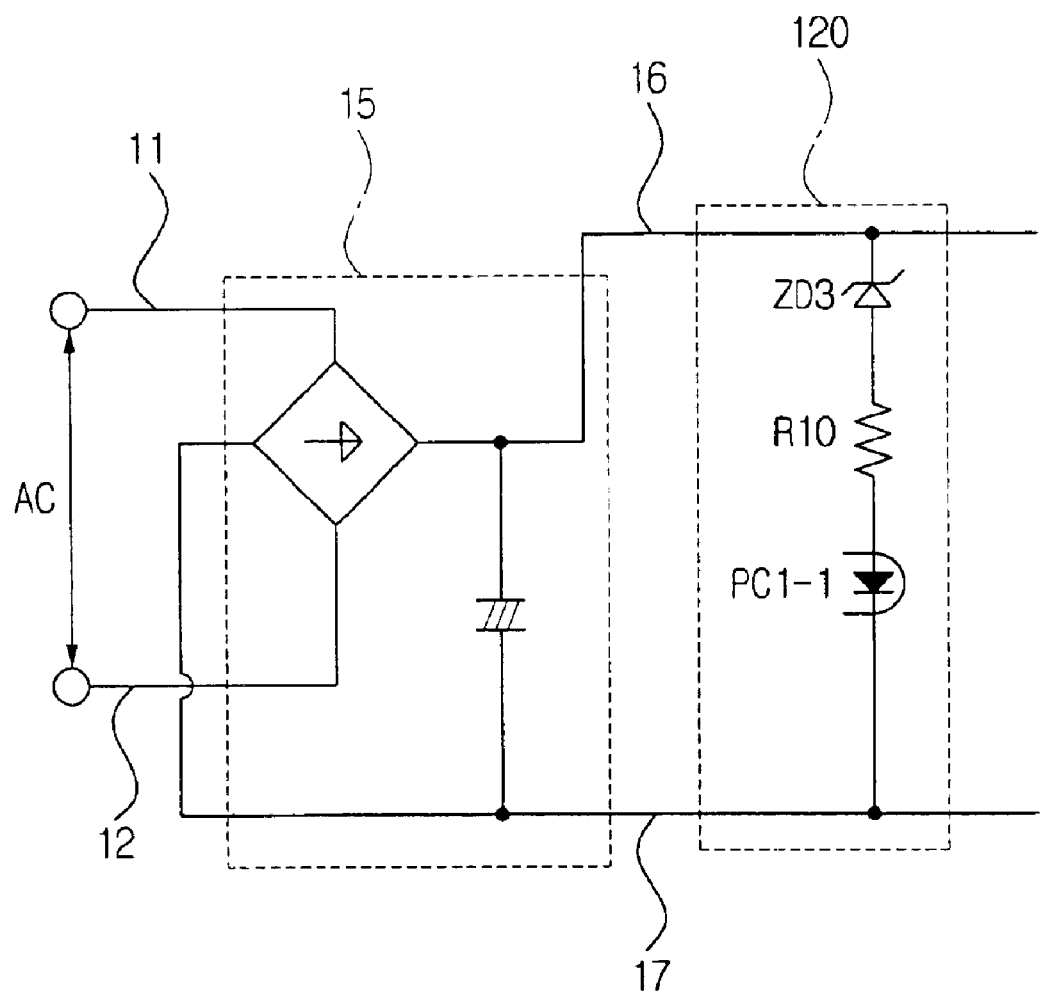
FIG. 3 is a circuit diagram showing an input voltage detector unit in accordance with a third embodiment of the present invention.

FIG. 3 is a circuit diagram showing an input voltage detector unit in accordance with a third embodiment of the present invention, and is an example of rectifying the AC voltage and detecting a smooth DC voltage.

The same reference numerals when used in FIGS. 1 and 3 denote the same elements.

As shown in FIG. 3, an input voltage detector 120 outputs a signal corresponding to an output voltage from a rectifier 15.

The input voltage detector 120 includes a zener diode ZD3, a resistance element R10 and a first luminous element PC1-1 connected in series between first and second output terminals 16 and 17 of the rectifier 15 rectifying and smoothing an input AC voltage through a first AC terminal 11 and a second AC terminal 12. A trigger voltage of the zener diode ZD3 is set to a voltage higher than a DC voltage generated by rectification of an AC voltage of 110V.

For the input voltage detector 120, a second switching unit 50 may include a phototransistor PC1-2 coupled with a luminous element PC1-1, and other elements may be adapted the same as shown in FIG. 1.

The second switching unit 50 may be controlled by an engine control unit 70 and the input voltage detector 120 may output a signal corresponding to an input voltage detected by the input voltage detector 120, which is different from the first embodiment in FIG. 1.

Figure 2:
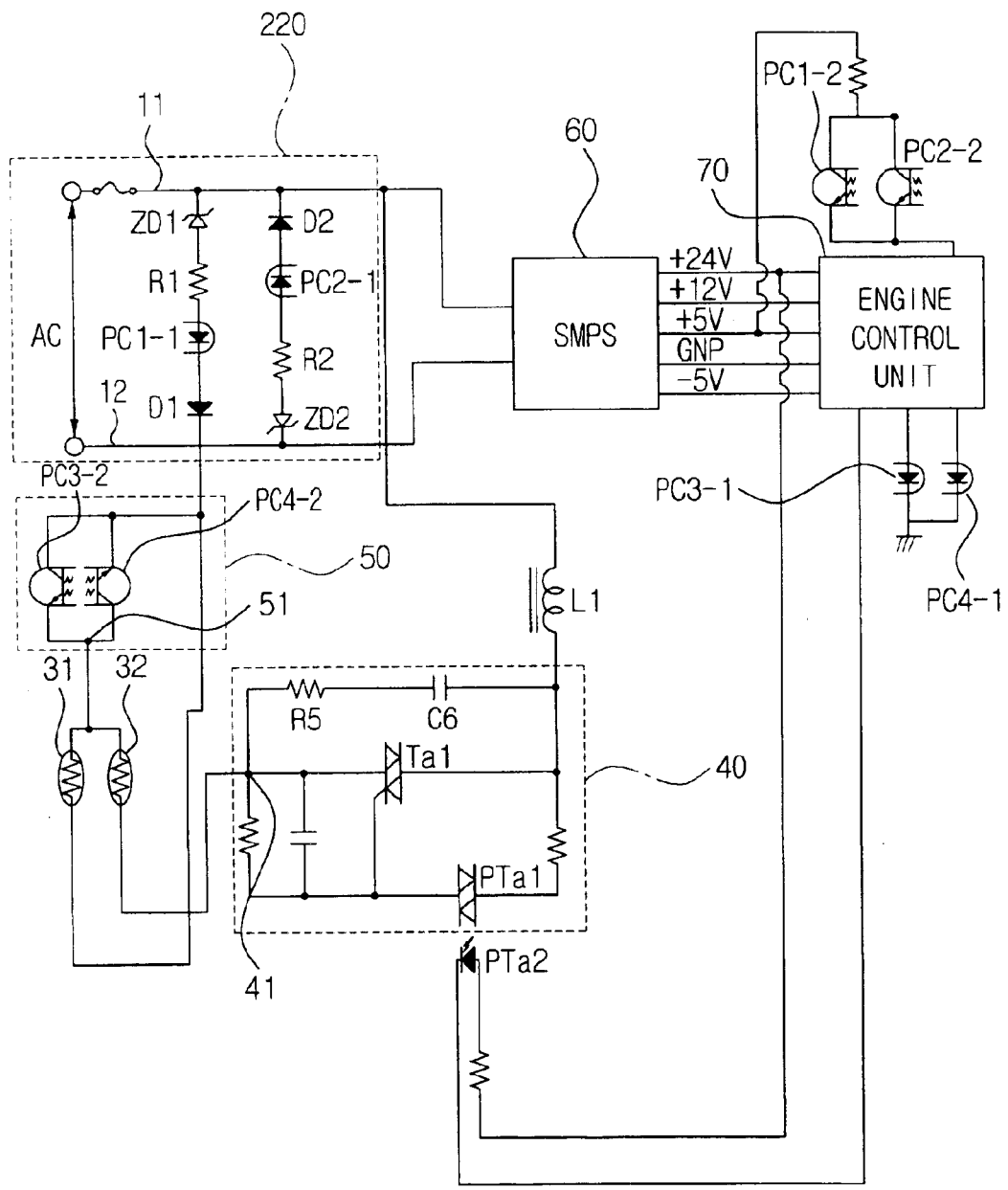
FIG. 2 is a circuit diagram showing a part of a printer in accordance with a second embodiment of the present invention.

FIG. 2 is a circuit diagram showing a part of a printer in accordance with a second embodiment of the present invention and includes another example of an input voltage detector.

The same reference numerals when used in FIGS. 1 and 3 denote the same elements.

As shown in FIG. 2, a first luminous diode PC1-1 and a second luminous diode PC2-1 of an input voltage detector 220 are coupled to output a luminance signal to a first phototransistor PC1-2 and a second phototransistor PC2-2, respectively, to connect the first and second phototransistors PC1-2 and PC2-2 to an engine control unit 70.

The input voltage detector 220 is different from the example in FIG. 1.

The input voltage detector 220 includes a first input voltage detector and a second input voltage detector connected in parallel between first and second AC terminals 11 and 12 to correspond to a phase of an AC signal, each of the first and second detectors includes a series of a zener diode ZD1 and ZD2, the luminous element PC1-1 and PC2-1, and a diode D1 and D2, respectively.

The first phototransistor PC1-2 and second phototransistor PC2-2 are connected in parallel to output a high signal or a low signal to an engine control unit 70 in response to being switched on/off.

The engine control unit 70 controls a third luminous diode and fourth luminous diode PC3-1 and PC4-1, thereby controlling third and fourth phototransistors PC3-2 and PC4-2, respectively, to turn on/off.

The engine control unit 70 determines an input voltage from the high or the low signal of the first and second phototransistors PC1-2 and PC2-2 in response to switching on or to switching off of the first phototransistor PC1-2 and second photo transistor PC2-2 coupled with the first and second luminous diode PC1-1 and PC2-1, respectively, and controls the third and fourth luminous diodes PC3-1 and PC4-1 to turn on/off in response to a determination thereof.

The fourth luminous diode PC4-1 and fourth phototransistor PC4-2 may be omitted. The first switching unit 40 may be omitted so that a second end 41 of a second resistance body 32 may be connected directly to the first AC terminal 11. The engine control unit 70 can control an operation of a fixing device appropriately by using the third luminous diode PC3-1.

Figure 4:
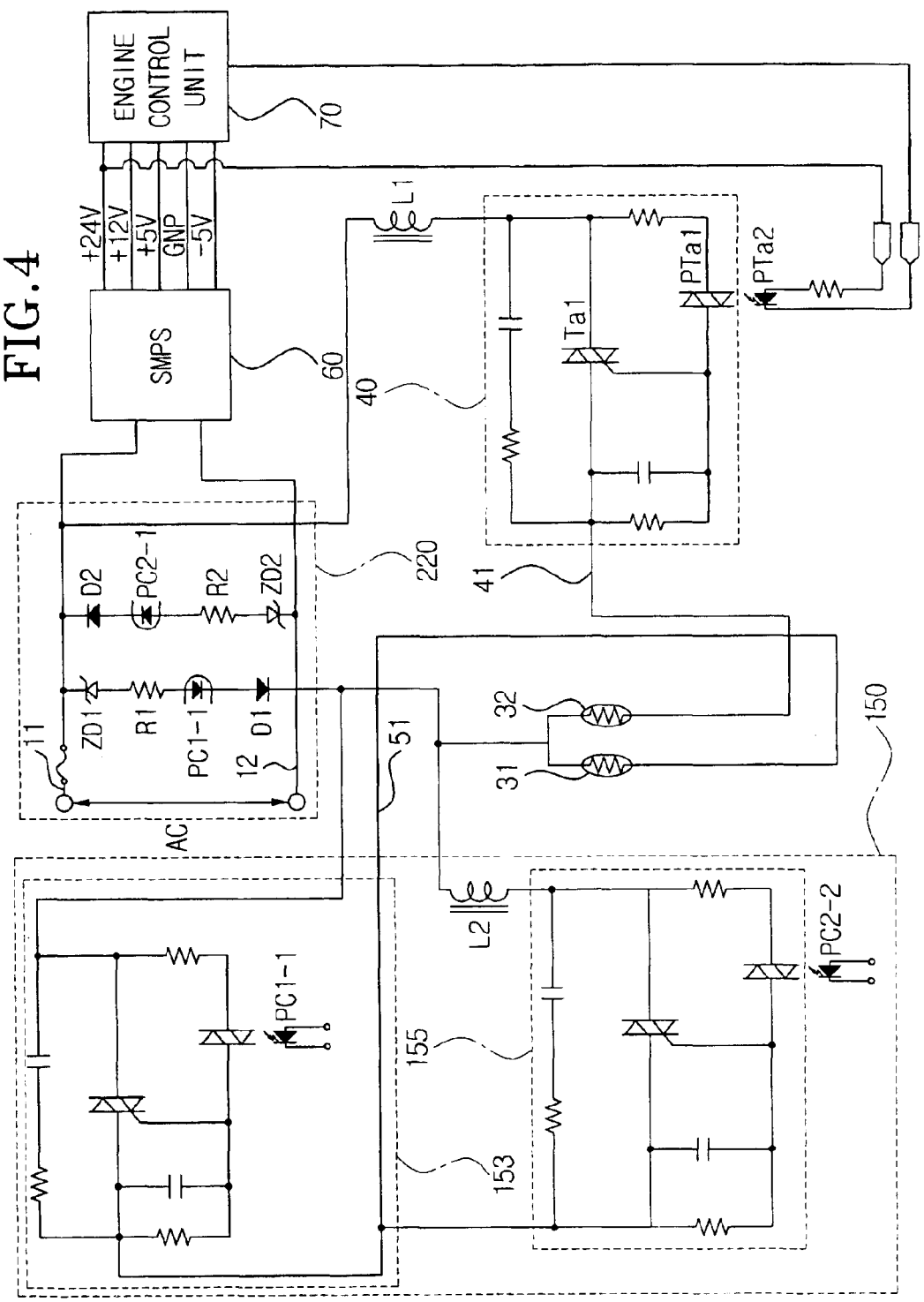
FIG. 4 is a circuit diagram showing a fixing device in accordance with a fourth embodiment of the present invention.

FIG. 4 shows another example of a second switching unit.

As shown in FIG. 4, the second switching unit 150 includes first and second sub-switching units 153 and 155, of an identical construction as a first switching unit 40, connected in parallel to turn on or to turn off in response to whether a first luminous diode PC1-1 and a second luminous diode PC2-1, respectively, radiate.

The construction of the second switching unit 150, which includes an inductor L2 between the second sub-switching unit 155 and first sub-switching unit 153 and the input voltage detector 220, is the same as that of the first switching unit 40, so the detailed description will be omitted herein.

As described hereinbefore, the 110V/220V switchable fixing device and the printer therewith may regulate and supply electric power properly to a heating resistance body, thereby reducing damage to parts of the 110V/220V switchable fixing apparatus.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A variable voltage switchable fixing apparatus of a printer having a control unit to control an engine of the printer, comprising:

an input voltage detector detecting an input voltage of a power supply inputted thereto and outputting a signal corresponding to the detected input voltage;

a first resistance body having a first end thereof connected to a second terminal of the power supply;

a second resistance body having a first end thereof connected to a second end of the first resistance body;

a first switching unit connected between a second end of the second resistance body and a first terminal of the power supply to switch on or to switch off in response to a control signal from the control unit; and a second switching unit connected between the second end of the first resistance body and the second terminal of the power supply to switch on or to switch off in response to the output signal from the input voltage detector.

2. The variable voltage switchable fixing apparatus according to claim 1, wherein the input voltage is either 110 volts or 220 volts.

3. The variable voltage switchable fixing apparatus according to claim 1, wherein input current is an alternating current.

4. The variable voltage switchable fixing apparatus according to claim 3, wherein:
the input voltage detector comprises:
a first input voltage detector unit having a first luminous element connected between the first terminal and a junction of a first zener diode and a first diode, wherein the first zener diode and the first diode are connected in series between the first and second terminals of the power supply; and
a second input voltage detector unit having a second luminous element connected between the second terminal of the power supply and a junction of a second zener diode and a second diode, wherein the second zener diode and the second diode are connected in series between the first and second terminals of the power supply, and
the second switching unit comprises:
a plurality of phototransistors connected in parallel to turn on or to turn off in response to whether the first and second luminous elements radiate.

5. The variable voltage switchable fixing apparatus according to claim 4, wherein the plurality of phototransistors comprise:
first and second phototransistors, turning on or turning off in response to whether the first and second luminous elements, respectively, radiate.

6. The variable voltage switchable fixing apparatus according to claim 4, wherein the first and second zener diodes have trigger voltages thereof of 110V or a voltage lower than maximum allowable voltages of 110V lamps, which are provided as the first and/or second resistance bodies to provide heat.

7. The variable voltage switchable fixing apparatus according to claim 4, wherein the input voltage detector forms a current path through the first and second luminous elements to radiate on a trigger voltage and a current path through the first and second zener diodes on a voltage higher than a preset voltage when the first and second luminous elements are off.

8. The variable voltage switchable fixing apparatus according to claim 4, further comprising;
a third luminous element, wherein the first switching unit comprises:
a series of a capacitor and a resistance element;
a triac connected in parallel with the series; and
a phototriac triggering a gate terminal of the triac, the third luminous element being coupled with the phototriac and controlled by the control unit.

9. The variable voltage switchable fixing apparatus according to claim 8, further comprising:
an inductor connected to the first and second ends of the second resistance body through the phototriac, wherein:
the first switching unit turns on or turns off a current flowing through the inductor; and
the phototriac is turned on/off in response to whether the third luminous element is radiating under a control of the control unit.

10. The variable voltage switchable fixing apparatus according to claim 3, further comprising:
a rectifier rectifying and smoothing the input voltage to generate a DC voltage, wherein the input voltage detector detects an output voltage from the rectifier and outputs a signal corresponding to the detected output voltage to the second switching unit.

11. The variable voltage switchable fixing apparatus according to claim 3, wherein:
the input voltage detector comprises:
a first input voltage detector comprising:
a first series of a first zener diode, a first luminous element and a first diode; and
a second input voltage detector unit comprising:
a second series of a second zener diode, a second luminous element and a second diode,
the first and second input voltage detectors connected in parallel between first and second terminals of the power supply to correspond to a phase of an alternating current signal.

12. The variable voltage switchable fixing apparatus according to claim 11, further comprising:
third and fourth luminous elements;
third and fourth phototransistors coupled to third and fourth luminous elements, respectively; and
first and second phototransistors connected in parallel to output a high signal or a low signal to the control unit in response to being switched on or switched off, wherein the control unit controls the third and fourth luminous elements to control the third and fourth phototransistors, respectively, to turn on or to turn/off.

13. The variable voltage switchable fixing apparatus according to claim 12, wherein the control unit determines the input voltage from the high or low signals of the first and second phototransistors in response to switching on or to switching off of the first phototransistor and second phototransistors coupled with the first and second luminous elements, respectively, and controls the third and fourth luminous elements to turn on or to turn off in response to a determined result.

14. The variable voltage switchable fixing apparatus according to claim 1, wherein the first resistance body and the second resistance body are lamps.

15. The variable voltage switchable fixing apparatus according to claim 1, wherein the first resistance body is a resistance element providing a voltage drop and the second resistance body is a lamp.

16. The variable voltage switchable fixing apparatus according to claim 1, further comprising:
an inductor connected to the first and second ends of the second resistance body through the first switching unit; and
a third luminous element, wherein:
the first switching unit turns on or turns off a current flowing through the inductor in response to whether the third luminous element is radiating under a control of the control unit.

17. The variable voltage switchable fixing apparatus according to claim 1, further comprising:
a fixing roller, wherein the first and second resistance bodies are disposed inside the fixing roller to heat the fixing roller.

18. The variable voltage switchable fixing apparatus according to claim 17, wherein:
the second switching unit is turned on when the input voltage is lower than or equal to a preset voltage so that power is supplied to the second resistance body in response to whether the first switching unit is turned on or turned off; and
the second switching unit is turned off when the input voltage is higher than the preset voltage so that the power is serially supplied to the first and second resistance bodies in response to whether the first switching unit is turned on or turned off.

19. The variable voltage switchable fixing apparatus according to claim 1, wherein portions of the input voltage are serially supplied to the first and second resistance bodies, respectively, or the input voltage is supplied only to the second resistance body according to operations of the first and second switching units.

20. A 110V/220V switchable printer, comprising:

a photoconductor;

a fixing apparatus transferring an image developed on the photoconductor by a developer to a paper and fixing the transferred image on the paper by applying a heat of a certain temperature;

an input voltage detector detecting an input voltage of a AC power supply inputted thereto and outputting a signal corresponding to the detected input voltage;

a first resistance body having a first end thereof connected to a second AC terminal of the AC power supply;

a second resistance body having a first end thereof connected to a second end of the first resistance body;

a first switching unit connected between a second end of the second resistance body and a first AC terminal of the AC power supply to switch on or to switch off;

a second switching unit connected between the second end of the first resistance body and the second AC terminal of the AC power supply to switch on or to switch off; and a control unit connected so as to input the signal outputted from the input voltage detector controlling the first and second switching units.

* * * * *

UNITED STATES PATENT AND TRADEMARK OFFICE
CERTIFICATE OF CORRECTION

| | | |
|---|---|---|
| PATENT NO. | : 6,947,683 B2 | Page 1 of 1 |
| APPLICATION NO. | : 10/603748 | |
| DATED | : September 20, 2005 | |
| INVENTOR(S) | : Tae-Kwon Na | |

It is certified that error appears in the above-identified patent and that said Letters Patent is hereby corrected as shown below:

Column 8,
Line 27, replace "turn/off with -- turn off --;

Column 9,
Line 16, after "voltage of" replace "a" with -- an --.

Signed and Sealed this

Twentieth Day of June, 2006

JON W. DUDAS
*Director of the United States Patent and Trademark Office*